(12) United States Patent
Nakayama

(10) Patent No.: US 8,351,092 B2
(45) Date of Patent: Jan. 8, 2013

(54) IMAGE READER AND MEDIUM PROCESSOR

(75) Inventor: Naohito Nakayama, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 506 days.

(21) Appl. No.: 12/602,296

(22) PCT Filed: May 30, 2008

(86) PCT No.: PCT/JP2008/001361
§ 371 (c)(1),
(2), (4) Date: Nov. 30, 2009

(87) PCT Pub. No.: WO2008/149527
PCT Pub. Date: Dec. 11, 2008

(65) Prior Publication Data
US 2010/0134852 A1    Jun. 3, 2010

(30) Foreign Application Priority Data
May 31, 2007   (JP) .................................. 2007-144408

(51) Int. Cl.
*H04N 1/04* (2006.01)
*G03G 21/16* (2006.01)
*G03G 15/00* (2006.01)
*G03G 21/00* (2006.01)
*C25D 5/44* (2006.01)

(52) U.S. Cl. ............ 358/474; 399/111; 399/71; 399/99; 205/214

(58) Field of Classification Search .................. 358/474; 399/111, 71, 99; 205/214
See application file for complete search history.

(56) References Cited

FOREIGN PATENT DOCUMENTS

| JP | 03-026172 | | 2/1991 |
|---|---|---|---|
| JP | 06-255840 | | 9/1994 |
| JP | 2004048184 A | * | 2/2004 |
| JP | 2005-327066 | | 11/2005 |
| JP | 2006-155568 | | 6/2006 |
| JP | 2006-282366 | | 10/2006 |

* cited by examiner

*Primary Examiner* — Charlotte M Baker
*Assistant Examiner* — Rury Grisham
(74) *Attorney, Agent, or Firm* — Frommer Lawrence & Haug LLP

(57) ABSTRACT

Provided are bristle brush rollers having bristles implanted on their surfaces. A gap exists between the bristle brush rollers and reading surfaces of scanners for allowing a medium to pass through. When transfer rollers transfer the medium in the medium transfer direction, the bristle brush rollers regulate a surface opposite to a to-be-read surface of the medium in order to guide the medium.

14 Claims, 9 Drawing Sheets

S1: HAVE INSERTION DETECTION SENSORS DETECTED MEDIUM?

S2: TRANSFERRING MEDIUM UP TO PRESCRIBED POSITION & READING CHARACTER INFORMATION AND THE LIKE

S3: HAS CHARACTER INFORMATION AND THE LIKE BEEN READ APPROPRIATELY?

IMAGE READER AND MEDIUM PROCESSOR

The present application claims priority from PCT Patent Application No. PCT/JP2008/001361 filed on May 30, 2008, which claims priority from Japanese Patent Application No. 2007-144408 filed on May 31, 2007, the disclosure of which is incorporated herein by reference in its entirety.

BACKGROUND OF THE INVENTION

1. Field of the Invention

The present invention relates to an image reader for reading character information and image information described or printed on a thin sheet medium, such as a check. Moreover, the present invention relates to a medium processor for processing a thin sheet medium, such as a check.

2. Description of Related Art

As an image reading apparatus for character information and image information (hereinafter called character information and the like) described or printed on a sheet medium, such as paper and so on, an image reader mounted on a copying machine, etc. is well known. In general, such an image reader is equipped with a scanner, which reads image information, and a platen roller placed at a position facing to the scanner. The platen roller, being formed with soft resin or foamed resin, is usually so placed as to press a read manuscript against a reading surface of the scanner and to hold the read manuscript there.

Patent Document 1 mentioned below proposes an image reader, in which a bristle brush roller is used as a platen roller and the bristle brush roller presses a read manuscript against a reading surface of a scanner and holds the read manuscript there. It is said that the bristle brush roller enables a transfer of any read manuscript in the image reader, regardless of the type of read manuscript; and also improves the quality of reading operation. Furthermore the bristle brush roller can have an electrically-neutralization effect against static electricity when it is formed with a conductive material.

Conventionally well known is a card reader that carries out reproducing operation etc. of magnetic information recorded in a card-like medium while transferring the medium. In the card reader, a datum surface for transfer motion, which works as a datum position in a shorter width-wise direction of the medium being transferred, is formed in a card path in order to correct any tilt of the medium in relation to a transfer direction and to take an appropriate action required for the medium being transferred. Such a card reader, in which a medium is smoothly moved toward the datum surface for transfer motion so as not to suffer damage even if the medium is a weak one, is proposed by the applicant of the present invention (For example, refer to Patent Document 2).

In a card reader described in Patent Document 2, an endless belt is hung over a plurality of drive rollers, and a medium is transferred by the endless belt. Namely, a medium path is formed along the endless belt, and the medium path is composed of a flat surface section formed among the drive rollers and a curved surface section formed along outer circumferences of the drive rollers. Furthermore, in the proximity of a border between the flat surface section and the curved surface section, there are placed transfer rollers whose portions opposite from the datum surface for transfer motion are so supported as to be movable in a transfer direction.

In the card reader, the medium keeps circulating along the medium path, until a scanner appropriately finishes reading character information and the like, on a surface of the medium as well as reproducing magnetic information recorded in the medium. Furthermore, when circulating along the medium path, the medium moves toward the datum surface for transfer motion by an action of the transfer rollers.

Patent Document 1: Japanese Unexamined Patent Application Publication No. H03-26172; and Patent Document 2: Japanese Unexamined Patent Application Publication No. 2006-282366.

SUMMARY OF THE INVENTION

1. Problems to Be Solved

However, in the case of an image reader in which platen rollers made of soft resin or foamed resin are used, it is needed to press the platen rollers against a reading surface of a scanner for accurately reading character information and the like described on a medium within a predefined depth of field. Therefore, if a medium having a staple or a clip attached to it is introduced and transferred, a reading surface of the scanner (usually a glass surface) is so bruised as to occasionally cause a problem to accurate reading operation.

Furthermore, even in the case of the image reader described in Patent Document 1 mentioned above, in which the bristle brush roller is used as a platen roller, a similar problem of bruising the reading surface as explained above is still caused, depending on a bristle material. Moreover, there is a chance that a medium is introduced into a space between a guide surface for guiding the medium being transferred and the bristle brush roller (for example, a gap between a guide plate and the bristle brush roller in the case of Patent Document 1) so that a jam may be caused (a problem of the medium being jammed and crushed). Especially when the medium is thin and sheet-like, such as a once-folded check or bill, a problem is that the medium has already become less elastic and a jam easily happens.

In the case of the card reader described in Patent Document 2, a medium can be moved smoothly toward the datum surface for transfer motion by the action of the transfer rollers placed in the proximity of the border between the flat surface section and the curved surface section, and even a medium that is weak in strength can avoid a damage in course of transfer motion. However, unfortunately in the case of the card reader, the medium path is formed along the endless belt for the purpose of circulating the medium for transfer operation so that an installation space for the medium path is large and an apparatus of the card reader becomes large-sized.

Thus, a first problem of the present invention is to provide an image reader that reads character information and image information described or printed on a thin sheet medium such as a check, while the image reader being able to accurately read the character information and the like within a predefined depth of field without bruising a reading surface of a scanner. Furthermore, a second problem of the present invention is to provide an image reader in which a jam is less likely to happen.

Still further, a third problem of the present invention is to provide a medium processor in which a medium can be moved smoothly toward a datum surface for transfer motion, and causing damage onto the medium during transfer can be avoided even if the medium being weak in strength, and the medium processor being able to be downsized.

2. Means to Solve the Problems

To solve the first and second problems described above, an image reader according to the present invention includes: a transfer path through which a sheet medium is transferred; a transfer means for transferring the medium through the transfer path; a scanner for reading image data printed on the medium by scanning mainly in a medium-width-wise direction, perpendicular to a medium transfer direction in which the medium is transferred, and by sub-scanning in the medium transfer direction; and a bristle brush roller facing the scanner across the transfer path and having bristles implanted on a surface of the roller; wherein a gap exists between the bristle brush roller and a reading surface of the scanner for allowing the medium to pass through; and when the transfer means transfers the medium in the medium transfer direction, the bristle brush roller regulates a surface opposite to a to-be-read surface of the medium in order to guide the medium.

According to the present invention; a gap exists between the bristle brush roller and the reading surface of the scanner for allowing the medium to pass through; and when the transfer means transfers the medium in the medium transfer direction, the bristle brush roller regulates a surface opposite to a to-be-read surface of the medium in order to guide the medium. Thus, character information and the like of the medium can be held within a depth of field of the scanner without bruising the reading surface of the scanner so that the first problem described above can be solved. Furthermore, the medium can be transferred, even if it is less-elastic, without causing a jam (a problem of the medium being jammed and crushed) so that the second problem described above can be solved. Still further, by using the bristle brush roller, it becomes possible to catch and hold a clip and a staple, attached to the medium, within the bristle brush roller so as to avoid causing damage on the reading surface of the scanner.

According to the present invention; it is preferable that the transfer path includes a flat guide for regulating the transfer path at a side of the bristle brush roller; and the guide further includes, an aperture through which the bristle brush roller faces the transfer path, and a plurality of protrusions protruding out of an edge of the aperture toward the bristle brush roller in a direction parallel with the medium transfer direction so as to push through bristles of the bristle brush roller.

According to the structure described above, the bristle brush roller is so assembled as to face the transfer path through the aperture of the guide; and a plurality of protrusions are so placed as to push through bristles of the bristle brush roller. Therefore, between the guide and the bristle brush roller, there exists no gap into which the medium being transferred can enter, so that it is possible to prevent the medium being transferred from entering the gap to cause a jam. In particular, according to the structure, a jam is unlikely to happen even when the medium is thin and sheet-like, such as a once-folded check or bill.

According to the present invention; it is preferable that each of the protrusions is shaped so as to have a triangle ship-prow form that gradually becomes thinner in section toward the bristle brush roller. According to the structure described above, since each of the protrusions is shaped so as to have a triangle ship-prow form, the bristle brush roller is not likely to have a trail (trace mark) of the protrusions, and the whole surface of the medium can have a brushing effect by the bristle brush.

According to the present invention; it is preferable that a neighboring part of the guide adjacent to the aperture is formed with a slope that becomes gradually distant from the transfer path toward the bristle brush roller in the medium transfer direction. According to the structure described above, a point of the neighboring part at the edge of the aperture is most distant from the transfer path. Therefore, the medium does not get hooked at the edge so as to enable reducing a chance of jamming.

According to the present invention; it is preferable that bristles of the bristle brush roller are made of an electrically-conductive material. According to the structure described above, static electricity that the medium may have can be removed.

According to the present invention; for example, the image reader is used for handling a thin sheet medium such as a check. In this case, the image reader can be used for handling a thin sheet medium, such as a once-folded less-elastic check or bill.

Furthermore, to solve the third problem described above, a medium processor according to the present invention includes: a transfer path through which a sheet medium is transferred; a transfer means for transferring the medium; and an evacuation path, connected to the transfer path, for evacuating the medium out of the transfer path, at least in a certain case; wherein a datum surface for transfer motion, providing a datum position in the medium-width-wise direction for the medium during its transfer motion, is formed at an end in the medium-width-wise direction of the transfer path, perpendicular to a transfer direction of the medium; the transfer means includes a transfer roller positioned in the transfer path for transferring the medium, and an opposing roller placed so as to oppose to the transfer roller and biased against the transfer roller; the opposing roller is supported in such a way that, in the pad roller, the opposite side from the datum surface for transfer motion is displace-able in the medium transfer direction; and the transfer means reciprocates the medium internally by using the evacuation path for shifting the medium toward the datum surface for transfer motion.

The medium processor according to the present invention includes, for example, a tilt detection means for detecting a tilt of the medium in the medium transfer direction; and the transfer means reciprocates the medium internally by using the evacuation path if the tilt detection means detects a tilt of the medium.

In the medium processor according to the present invention; the opposing roller opposing to the transfer roller is supported in such a way that, in the opposing roller, the opposite side from the datum surface for transfer motion is displace-able in the medium transfer direction. Therefore, when the medium being transferred comes in contact with the opposing roller, the opposing roller is tilted in such a direction to shift the medium toward the datum surface for transfer motion while using the side of the datum surface for transfer motion as a fulcrum. Accordingly, by the action of the opposing roller, the medium being transferred can smoothly be shifted toward the datum surface for transfer motion. Then, if the medium is tilted in the medium transfer direction, the tilt can be corrected by making the medium contact with the datum surface for transfer motion. Furthermore, by setting the displacement amount of the opposing roller appropriately, it is possible to avoid an excessive load on the medium moving toward the datum surface for transfer motion. Therefore, it becomes possible to protect the medium, even if being with less strength, from damage during transfer operation.

Furthermore, in the medium processor according to the present invention; the transfer means reciprocates the medium internally by using the evacuation path for shifting the medium toward the datum surface for transfer motion. Namely, according to the present invention; for correcting the tilt of the medium, if required, in the medium transfer direction by shifting the medium toward the datum surface for transfer motion; the evacuation path is prepared in order to reciprocate the medium. Therefore, in comparison with a structure of a conventional art in which a transfer path is so formed as to circulate the medium, an installation space for the transfer path and the evacuation path can be reduced. As a result, the apparatus according to the present invention can be downsized.

Still further, in the medium processor according to the present invention; in order to shift the medium toward the datum surface for transfer motion, the transfer means reciprocates the medium internally by using the evacuation path. Therefore, in comparison with a case where the medium is circulated, a transfer distance of the medium for shifting the medium toward the datum surface for transfer motion can be shortened. Then, in accordance with the present invention, handling time for the medium can be shortened. Moreover, according to the present invention, the transfer roller as well as the opposing roller are placed in the transfer path; and therefore, installing an appropriate number of transfer rollers and opposing rollers makes it possible to shift the medium toward the datum surface for transfer motion in a short time, in comparison with a structure of a conventional art in which transfer rollers are placed in proximity to a border between a flat surface part and a curved surface part.

According to the present invention; it is preferable that the transfer path is so formed almost on the straight as to allow the medium being transferred to move straight; and the evacuation path is so formed as to be branched from the transfer path and to curve toward one of upward and downward directions from the transfer path. In this case, for example, the medium processor includes a medium insertion section for inserting the medium; and the evacuation path is so formed as to be branched from a side of the medium insertion section in the transfer path. According to the structure described above, the apparatus can be downsized in the medium transfer direction. Furthermore, since the transfer path is formed to be almost linear, the medium to be transferred through the transfer path can easily be protected from damage.

According to the present invention; it is preferable that the medium processor includes a transfer direction changing means at a border between the transfer path and the evacuation path for enabling transfer operation of the medium from the transfer path to one of the medium insertion section and the evacuation path. According to the structure described above, the medium to be reciprocated can be guided into the evacuation path for sure.

According to the present invention; it is preferable that the opposing roller is supported in such a way that, in the opposing roller, the opposite side from the datum surface for transfer motion is displace-able in both the back-and-forth directions of the medium transfer direction from a condition where the medium-width-wise direction is almost in line with an axis direction of the opposing roller. According to the structure described above, through transfer operation in either direction, the medium to be reciprocated is shifted toward the datum surface for transfer motion by the action of the opposing roller. Accordingly, the medium can be shifted to the datum surface for transfer motion in a short time for correcting the tilt of the medium.

According to the present invention; it is preferable that the medium processor includes the medium insertion section for inserting the medium; the medium insertion section further includes a medium passage through which the medium passes, a shutter for opening and blocking the medium passage, and an insertion detection means placed at a side of the datum surface for transfer motion for detecting the medium being inserted; and when the insertion detection means detects the medium, the shutter opens the medium insertion section and/or the transfer means starts operation for taking in the medium into the medium processor. According to the structure described above; insertion of the medium into the medium processor can be done under condition where an edge of the medium is positioned in proximity to the datum surface for transfer motion in the medium-width-wise direction. Therefore, the medium inserted can be shifted to the datum surface for transfer motion in a short time.

According to the present invention; it is preferable that the medium processor includes a displacement amount adjusting means for adjusting the displacement amount of the opposing roller at its side opposite from the datum surface for transfer motion. According to the structure described above; the displacement amount of the opposing roller can be set according to the strength of the medium. In other words, the tilt of the opposing roller can be set in accordance with the strength of the medium. Accordingly, it is possible to avoid an excessive load on the medium moving toward the datum surface for transfer motion. Therefore, it becomes possible to protect the medium with less strength from damage during transfer operation for sure. Furthermore, the medium having a fairly high strength can be shifted to the datum surface for transfer motion in a short time.

3. Advantageous Effect of the Invention

As described above, an image reader according to the preset invention can hold character information and the like of a medium within a depth of field of a scanner without bruising a reading surface of the scanner, and furthermore the image reader can transfer a medium, even if it is less-elastic, without causing a jam (a problem of the medium being jammed and crushed). Still further, by using a bristle brush roller, it becomes possible to catch and hold a clip and a staple, attached to the medium, within the bristle brush roller so as to avoid causing damage on the reading surface of the scanner.

Moreover, between a guide member and the bristle brush roller, there exists no gap that a medium being transferred may enter. Therefore, it is possible to prevent the medium from entering the gap to cause a jam. Especially, even when the medium is thin and sheet-like, such as a once-folded check or bill, a jam is less likely to happen.

Furthermore, in a medium processor according to the preset invention, a medium can be moved smoothly toward a datum surface for transfer motion, and causing damage onto the medium during transfer can be avoided even if the medium is weak in strength. Still further, the medium processor according to the preset invention can be downsized.

BRIEF DESCRIPTION OF THE DRAWINGS

FIGS. 6A and 6B are drawings for explaining an action of the pad roller shown in FIG. 5, wherein FIG. 6A and FIG. 6B show conditions where a medium is transferred toward a backside and a front side, respectively;

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

An embodiment of the present invention is described below with reference to the accompanying drawings.

1. General Structure of Image Reader

Figure 1:
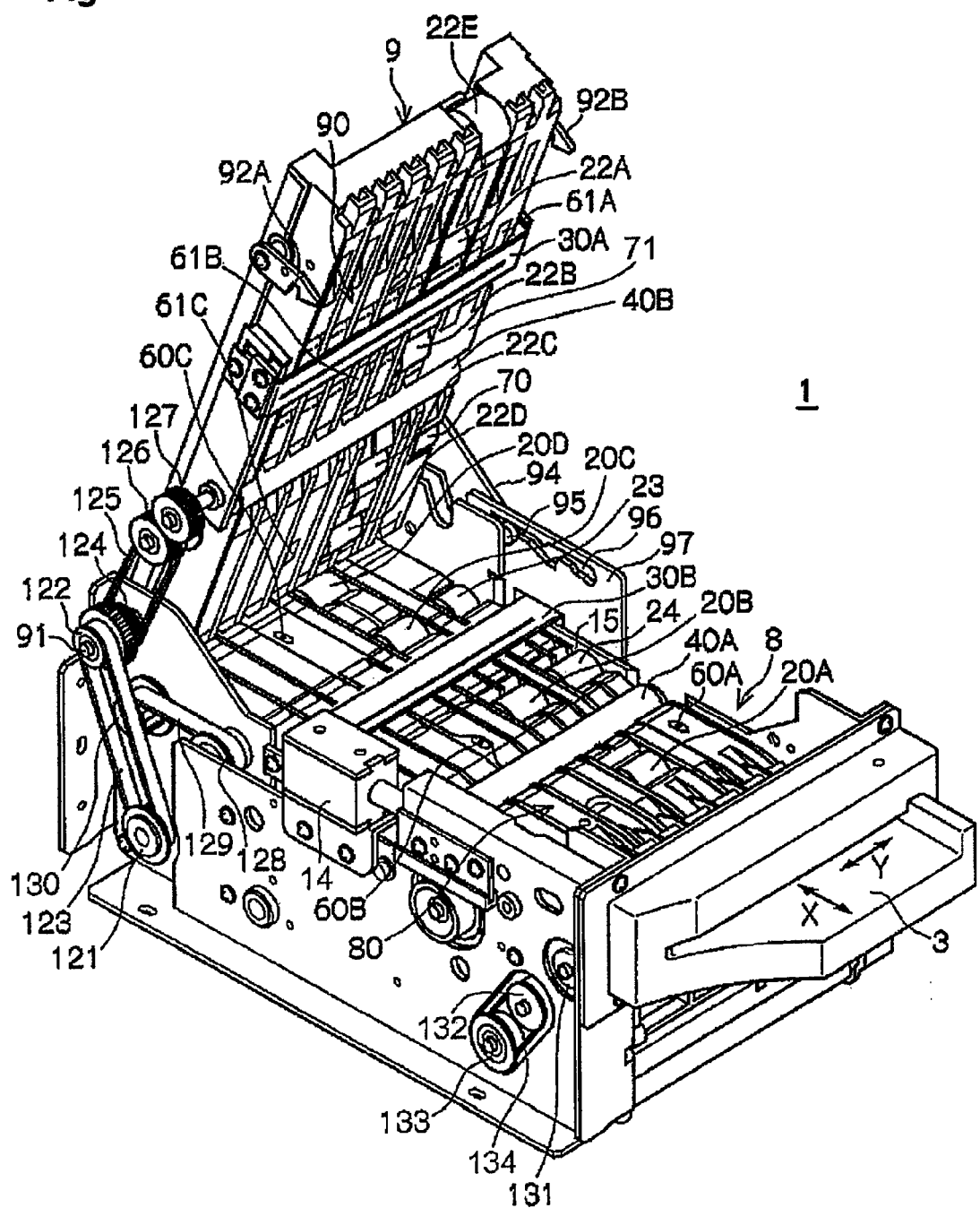
FIG. 1 is a perspective view showing an image reader according to an embodiment of the present invention; and the drawing shows a condition where an upper transfer block constituting a transfer path is lifted up.
Figure 2:
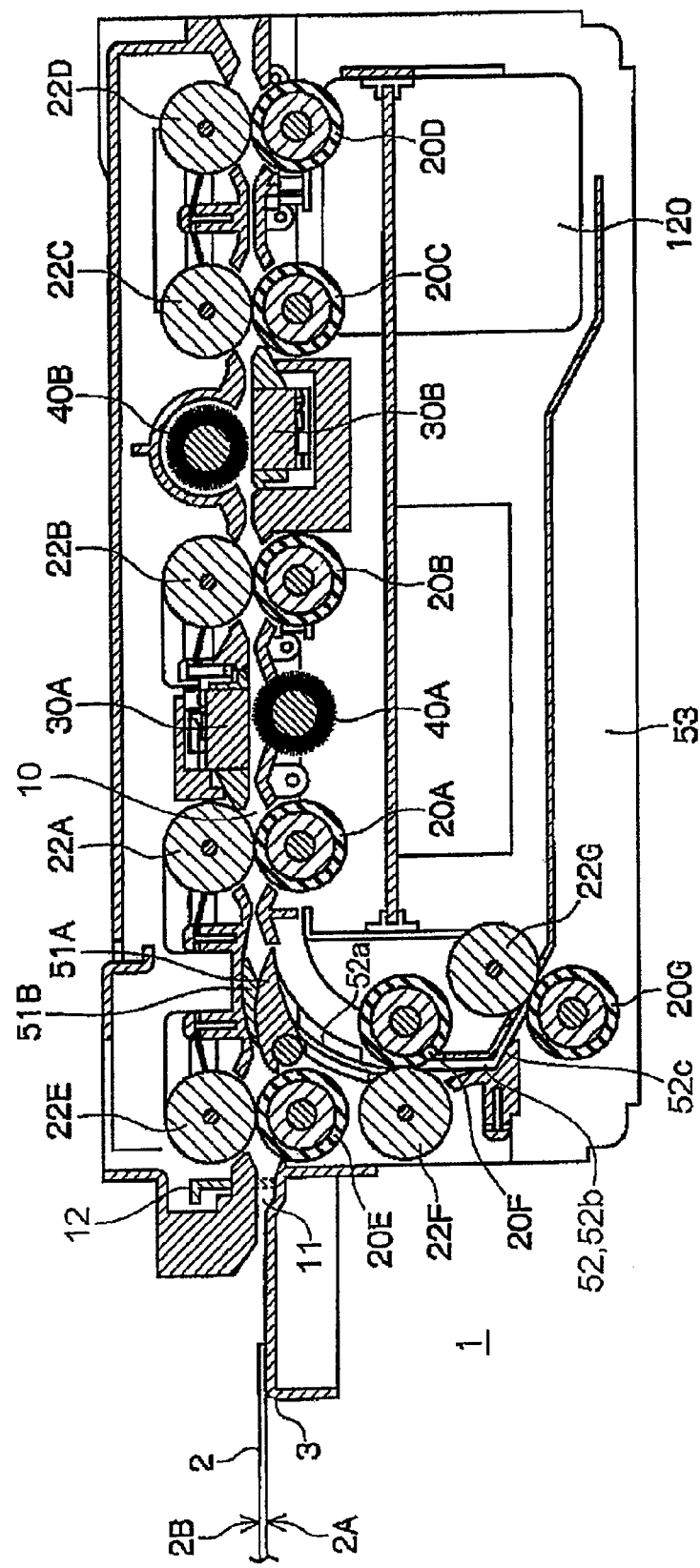
FIG. 2 is a cross-sectional structural drawing of the image reader shown in FIG. 1, wherein the upper transfer block is closed under the condition.

FIG. 1 is a perspective view showing an image reader 1 according to an embodiment of the present invention; and the drawing shows a condition where an upper transfer block 9 constituting a transfer path 10 is lifted up. FIG. 2 is a cross-sectional structural drawing of the image reader 1 shown in FIG. 1, wherein the upper transfer block 9 is closed under the condition.

In the image reader 1 according to the present embodiment, a sheet medium 2 inserted through a medium insertion section 3 is led into a transfer path 10, and then a scanner 30 placed in the transfer path 10 reads character information and the like described or printed on the medium 2. After the reading operation, the medium 2 is either transferred further by transfer rollers 20 to another apparatus (a printer etc.) placed still behind the image reader, or unloaded through the medium insertion section 3. In other words, the image reader 1 according to the present embodiment is a medium processor that carries out a prescribed process for the medium 2. Incidentally, in the present description, "front side" and "backside" mean a side of the medium insertion section 3 of the image reader 1 and the other side opposite to the front side (i.e., a backside of the image reader 1), respectively.

As shown in FIG. 1 and FIG. 2, the image reader 1 according to the present embodiment includes: the transfer path 10 through which the sheet medium 2 is transferred; a transfer means that transfers the medium 2 in the image reader 1; scanners 30 that read image data printed on the medium 2 by scanning mainly in a medium-width-wise direction "Y", perpendicular to a medium transfer direction (transfer direction) "X" in which the medium 2 is transferred, and by sub-scanning in the medium transfer direction "X"; and bristle brush rollers 40 that face the scanners 30 across the transfer path 10 and have bristles implanted on surfaces of the rollers (bristle-implanted).

Furthermore, the image reader 1 according to the present embodiment has a gap "G" between the bristle brush rollers 40 and reading surfaces 31 of the scanners 30, the gap "G" allowing the medium 2 to pass through. The image reader 1 is structured in such a way that; when the transfer means transfers the medium 2 in the medium transfer direction "X" through around a front-side neighboring section of the transfer path 10, a bristle brush roller 40A regulates a surface 2A opposite to a to-be-read surface 2B of the medium 2 in order to guide the medium 2; and meanwhile, when the transfer means transfers the medium 2 in the medium transfer direction "X" through around a backside neighboring section of the transfer path 10, a bristle brush roller 40B regulates a surface 2B opposite to a to-be-read surface 2A of the medium 2 in order to guide the medium 2.

In the following explanation as well as the reference drawings, an alphabetical capital letter is added to follow a reference numeral for the purpose of identifying each of a multiple members when there exist the multiple members identically corresponding to the reference numeral. When all of the multiple members are named generically, only the reference numeral is used for explanation without the alphabetical capital letter. Each structure in the image reader 1 is explained below 2. Medium The sheet medium 2 is a thin sheet, being such as a check or bill, made of paper; and it is an object to be read in the image reader 1. Such a paper medium like a check, etc. is thin (for example, 0.05 mm to 0.20 mm in thickness), and it is used and stored while being folded or in a similar condition so that it is occasionally less elastic. However, the image reader 1 according to the present embodiment can appropriately treat the sheet medium 2, even being in such a condition.

3. Structure Overview of the Medium Insertion Section

Figure 3:
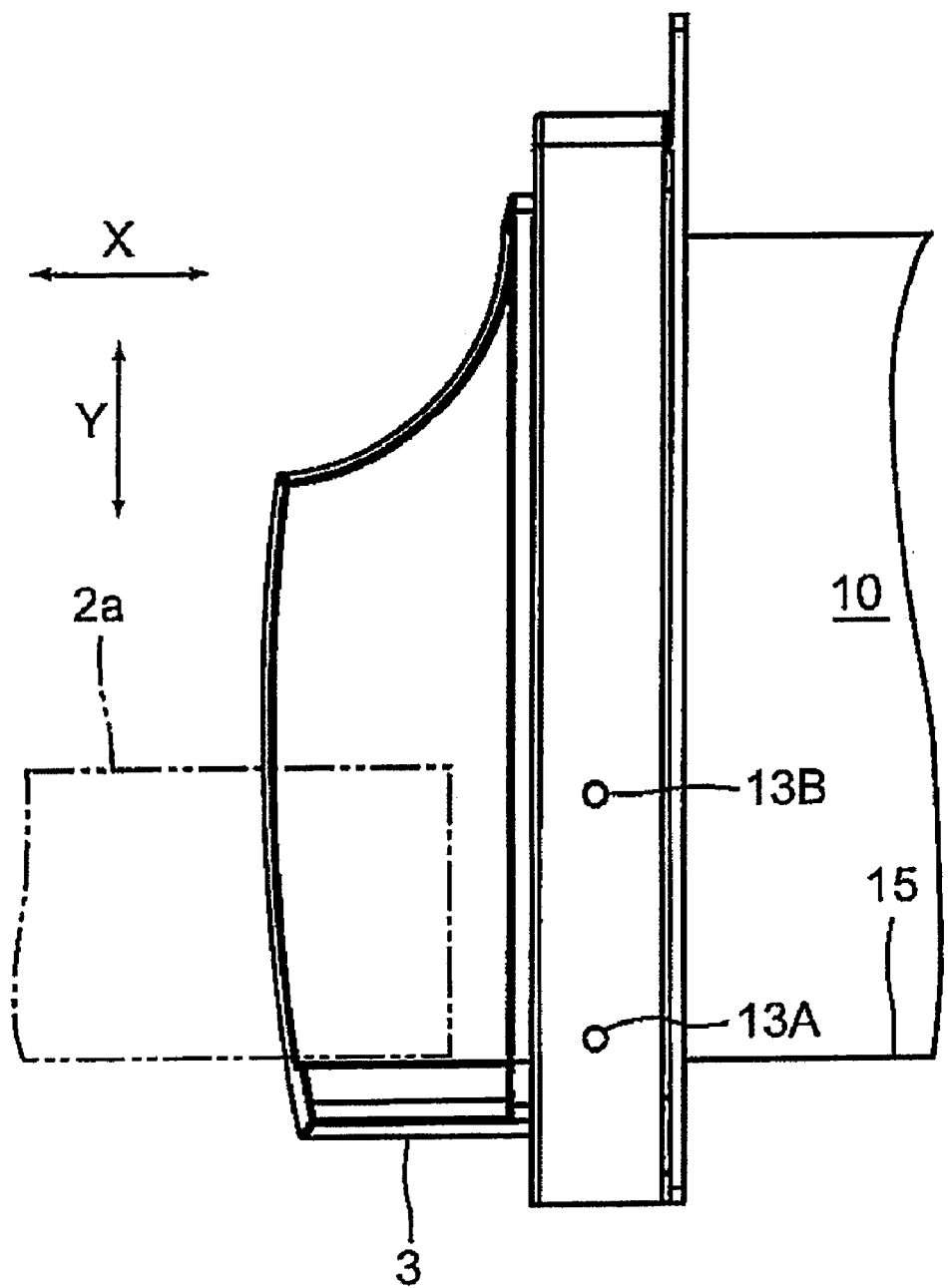
FIG. 3 is a schematic plan view explaining a layout location of insertion detection sensors in a medium insertion section shown in FIG. 1.

FIG. 3 is a schematic plan view explaining a layout location of insertion detection sensors 13 in the medium insertion section 3 shown in FIG. 1.

As shown in FIG. 2; a medium passage 11, through which the medium 2 passes, is formed in the medium insertion section 3. The medium insertion section 3 includes a shutter 12, which opens and blocks the medium passage 11 (Refer to FIG. 2), and two insertion detection sensors 13 for detecting the medium 2 being inserted (Refer to FIG. 3).

Each of the insertion detection sensors 13 is, for example, an optical sensor (photo-interrupter) including a light emitting element (not shown) and a light acceptance element (not shown), wherein the light emitting element and the light acceptance element are placed so as to face each other across the medium passage 11.

An insertion detection sensor 13A, one of the two insertion detection sensors 13, is located at a side of one end of the medium insertion section 3 in the medium-width-wise direction "Y", as shown in FIG. 3. Concretely to describe, the insertion detection sensor 13A is located at a side of a datum surface for transfer motion 15, which is described later, formed in the transfer path 10. In the present embodiment, the insertion detection sensor 13A is located at a position neighboring to a place, where the datum surface for transfer motion 15 is formed, in the medium-width-wise direction "Y". Then, the insertion detection sensor 13A in the present embodiment works as an insertion detection means located at the side of the datum surface for transfer motion 15.

The other of the two sensors (i.e., an insertion detection sensor 13B) is placed to have a prescribed distance in the medium-width-wise direction "Y" away from the insertion detection sensor 13A. Concretely to describe, insertion detection sensor 13B is placed to have the prescribed distance away from the insertion detection sensor 13A in such a way that a medium 2a having a minimum width 2a to be treated by the image reader 1 can be detected by using the two sensors (i.e., insertion detection sensors 13A and 13B).

In the present embodiment; when the image reader 1 is in standby condition waiting for insertion of the medium 2, the shutter 12 blocks the medium passage 11. Under the condition, if the insertion detection sensor 13B detects the medium 2, the shutter 12 opens the medium passage 11. On the other hand, if the insertion detection sensor 13A detects the medium 2 under the condition, the transfer rollers 20, constituting the transfer means and to be described later, start turning operation to take the medium 2 into the image reader 1. In other words, unless both of the two sensors (i.e., insertion detection sensors 13A and 13B) detect the medium 2, the image reader 1 cannot take in the medium 2 in the present embodiment. Furthermore, in the present embodiment, the shutter 12 is so connected to a solenoid 14 (Refer to FIG. 1) via a predetermined link mechanism (not shown) as to open/close the medium passage 11 under power of the solenoid 14.

Incidentally, it is also possible that detecting the medium 2 by the insertion detection sensor 13A makes the shutter 12 open the medium passage 11, and meanwhile detecting the medium 2 by the insertion detection sensor 13B makes the transfer rollers 20, constituting the transfer means and to be described later, start turning operation. Furthermore, it is also possible that the shutter 12 opens the medium passage 11 and the transfer rollers 20 start turning operation, after a higher-level host computer or a control unit of the image reader 1 recognizes that both of the two sensors (i.e., insertion detection sensors 13A and 13B) have detected the medium 2.

4. Structure Overview of the Transfer Path

Figure 4:
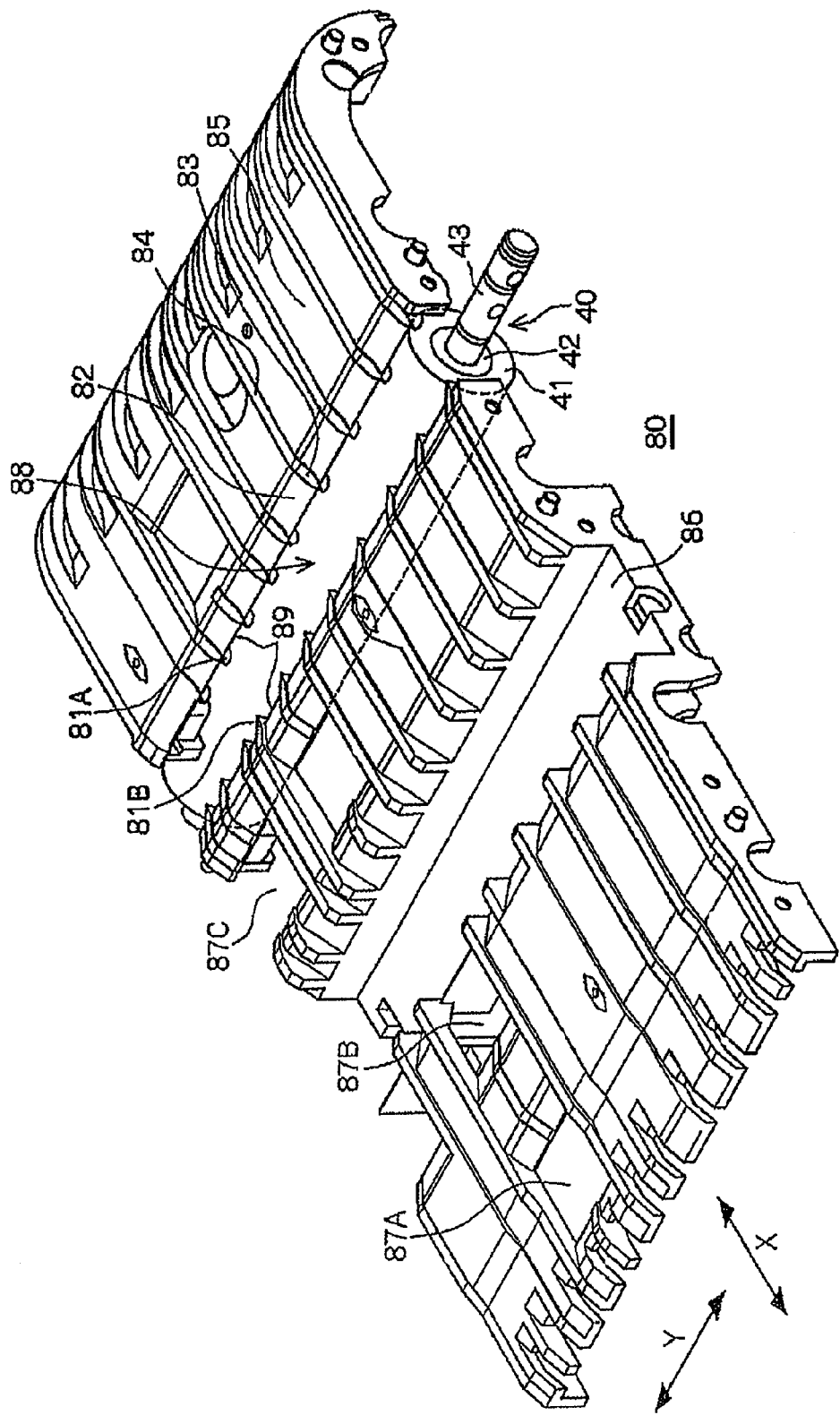
FIG. 4 is a perspective view showing a guide member of a lower transfer stage constituting the image reader shown in FIG. 1.

FIG. 4 is a perspective view showing a guide 80 of a lower transfer stage 8 constituting the image reader 1 shown in FIG. 1.

The transfer path 10 is a carrier track for the medium 2; and as shown in FIG. 1 and FIG. 2, the transfer path 10 includes: a guide 90 of the upper transfer block 9 and the guide 80 of the lower transfer stage 8, wherein the guide 90 and the guide 80 facing each other in a vertical direction; and two side plates constituting side sections of the image reader 1. To enable the medium 2 to travel straight, the transfer path 10 extends on the straight in a horizontal direction of FIG. 2. Namely, the transfer path 10 is so formed almost on the straight as to allow the medium 2 being transferred to move straight.

In the transfer path 10, the medium 2 is transferred in the medium transfer direction "X" by transfer rollers 20A to 20D and pad rollers 22A to 22D facing the transfer rollers 20A to 20D; wherein the transfer rollers 20A to 20D and the pad rollers 22A to 22D constituting the transfer means. Although the transfer rollers 20A to 20D are placed in the lower transfer stage 8 and the pad rollers 22A to 22D are placed in the upper transfer block 9 in the present embodiment, their layout are not necessarily limited to the arrangement described above. All or part of the transfer rollers 20A to 20D may be placed in the upper transfer block 9, while all or part of the pad rollers 22A to 22D may be placed in the lower transfer stage 8.

Formed at an end of the transfer path 10 in the medium-width-wise direction "Y" is the datum surface for transfer motion 15, which provides a datum position in the medium-width-wise direction "Y" for the medium 2 during its transfer motion. In the present embodiment, a part of a side plate placed at a backside in the drawing of FIG. 1 works as the datum surface for transfer motion 15. Then, the transfer path 10 is structured, for example, to have its width of 65 mm to 110 mm in order to cope with various types of the medium 2 with different width. In the meantime, height "H" of the transfer path 10 (Gap; refer to FIG. 7) is usually around 1 mm to 3 mm, since the gap should preferably make it possible for even a media having a wrinkle caused through handling to easily move through.

The guide 80 of the lower transfer stage 8, which constitutes the transfer path 10, is a guiding member that is so placed at a lower side of the transfer path 10 as to face the guide 90 of the upper transfer block 9. Preferably, the guide 80 should be a resin-made molded component as shown in FIG. 4, but any other type of component may be used. On a surface of the guide 80 at a side of the transfer path 10, there are placed a plurality of slit guides 84 extending along the medium transfer direction "X" (Refer to FIG. 4). The slit guides 84 work for helping the medium 2 to move along the medium transfer direction "X", being formed at arbitrary intervals on a flat surface 85 so as to be protrusions with prescribed height.

Meanwhile, the guide 90 of the upper transfer block 9, which constitutes the transfer path 10, is so placed as to face the guide 80 of the lower transfer stage 8, and the upper transfer block 9 is open-able. Preferably, the guide 90 should also be a resin-made molded component as the guide 80 described above is, but any other type of component may be used. Furthermore, on a surface of the guide 90 at a side of the transfer path 10 as well, there are also placed a plurality of slit guides extending along the medium transfer direction "X" (Refer to FIG. 1), in the same manner as the guide 80 have slit guides.

Opening and closing the upper transfer block 9 is carried out by using a support shaft 91 as a fulcrum, the support shaft 91 being also used as a shaft for a pulley 122 constituting the transfer means. Positions of the upper transfer block 9, when it is opened and closed, are called "an open position" (See FIG. 1) and "a closed position" (See FIG. 2), respectively. Then, the image reader 1 includes: a retaining means (Reference numerals 94 to 96), for retaining the upper transfer block 9 at the open position; and a locking means (Reference numeral 92), for holding the upper transfer block 9 at the closed position.

Although no specific limitation exists for the retaining means (Reference numerals 94 to 96), an example of FIG. 1 shows a support bar 94 equipped with a latch pin 95 at a tip of the support bar 94, and a plate 97 having engaging parts 96 with which the latch pin 95 is engaged at several positions, as elements of the retaining means. Namely, when the latch pin 95 at the tip of the support bar 94 is engaged with a prescribed one of the engaging parts 96, the upper transfer block 9 is retained at the prescribed open position. In the meantime, for changing from the open position to the closed position, the latch pin 95 is shifted so as to be engaged with another prescribed one of the engaging parts 96, while the upper transfer block 9 being held by hand.

The upper transfer block 9 is locked at the closed position by using lock levers 92A and 92B placed at both sides of the upper transfer block 9, and lock pins, not shown, which are engaged with recessed parts formed in the lock levers 92A and 92B. Incidentally, one end of each of the lock levers 92A and 92B is assembled together with a spring mechanism (not shown), with which a corresponding one of the lock levers 92A and 92B is biased, to the upper transfer block 9.

The lower transfer stage 8 and the upper transfer block 9 are equipped with sensor mechanisms for detecting a position of the medium 2. The image reader 1 shown in FIG. 1 includes light emitting elements 60 (60A, 60B, and 60C), which the lower transfer stage 8 has, and light acceptance elements 61 (61A, 61B, and 61C), which the upper transfer block 9 has. Cited as an example of the sensor mechanisms can be a system of photo-interrupters, in which each of the light emitting elements 60 (60A, 60B, and 60C) and each corresponding one of the light acceptance elements 61 (61A, 61B, and 61C) are placed face to face so that the light acceptance elements 61 detect the medium 2, intercepting light beams launched from the light emitting elements 60, to judge the presence of the medium 2 and its position.

Furthermore, the upper transfer block 9 includes a magnetizing head 71 for magnetizing MICR (Magnetic Ink Character Recognition) data to be described on a surface of the medium 2, and a magnetic head 70 for reproducing the MICR data described by the magnetizing head 71. Meanwhile, the lower transfer stage 8 includes a pad roller 24 placed side by side with the transfer roller 20B, at a position facing the magnetizing head 71. Furthermore, the lower transfer stage 8 includes a pad roller 23 placed side by side with the transfer roller 20C, at a position facing the magnetic head 70.

5. Structure Overview of Evacuation Path

As shown in FIG. 2, the image reader 1 according to the present embodiment includes an evacuation path 52 for evacuating the medium 2 from the transfer path 10, at least in a certain case, without exposing the medium 2 through the medium insertion section 3. The evacuation path 52 is connected to the transfer path 10. In the present embodiment, the evacuation path 52 is so formed as to be branched from a front side of the transfer path 10. Then, the evacuation path 52 includes: a curved part 52a whose top end is connected to the transfer path 10; a flat part 52b connected to a bottom end of the curved part 52a; and a sloped flat part 52c connected to a bottom end of the flat part 52b. Thus, the evacuation path 52, as a whole, is so formed as to curve downward from the transfer path 10.

The curved part 52a is so formed as to have a curved surface bulging toward the front side. The flat part 52b is formed to have a flat surface in parallel with a vertical direction in FIG. 2. The sloped flat part 52c is formed to have a flat surface that slopes downward in a direction to the backside. Therefore, when being introduced into the evacuation path 52, the medium 2 is transferred toward the front side at first, and subsequently transferred toward the backside. Incidentally, the evacuation path 52 may be formed only with a curved section whose top end is connected to the transfer path 10.

Positioned at a border between the transfer path 10 and the evacuation path 52 is a change lever 51 as a transfer direction changing means that enables transfer operation of the medium 2 from the transfer path 10 to either the medium insertion section 3 or the evacuation path 52. The change lever 51 is connected to the solenoid 14 via a predetermined link mechanism (not shown), and it operates in conjunction with opening/closing operation of the shutter 12. Concretely to describe, when the change lever 51 has its open position 51A that allows the medium 2 to be transferred from the transfer path 10 to the medium insertion section 3, the shutter 12 opens the medium passage 11. Meanwhile, when the change lever 51 has its closed position 51B that allows the medium 2 to be transferred from the transfer path 10 to the evacuation path 52, the shutter 12 closes the medium passage 11.

In the present embodiment, for shifting the medium 2 toward the datum surface for transfer motion 15, the medium 2 is reciprocated back and forth in the image reader 1 by using the evacuation path 52, as described later. In other words, when the medium 2 is shifted toward the datum surface for transfer motion 15, the change lever 51 has its closed position 51B.

Furthermore, the evacuation path 52 also functions as a recovery transfer path for recovering the medium 2, when it is judged that the medium 2 should be recovered as a result of information reading operation by the scanner 30. Concretely to describe, the medium 2 inserted through the medium insertion section 3 is transferred toward the backside by turning operation of the transfer rollers 20E, 20A, 20B, 20C, and 20D, in order to read the character information and the like of the medium 2, as described later. Then, if once the higher-level host computer judges that it is needed to recover the medium 2, the transfer rollers 20A to 20D rotate in a counter direction to return the medium 2 back toward the front side. At that time, the change lever 51 has its closed position 51B so that the medium 2 coming back toward the front side is guided into the evacuation path 52, and eventually it is distributed to a recovery area 53 by transfer rollers 20F and 20G in the evacuation path 52.

6. Structure of the Transfer Means

Figure 5:
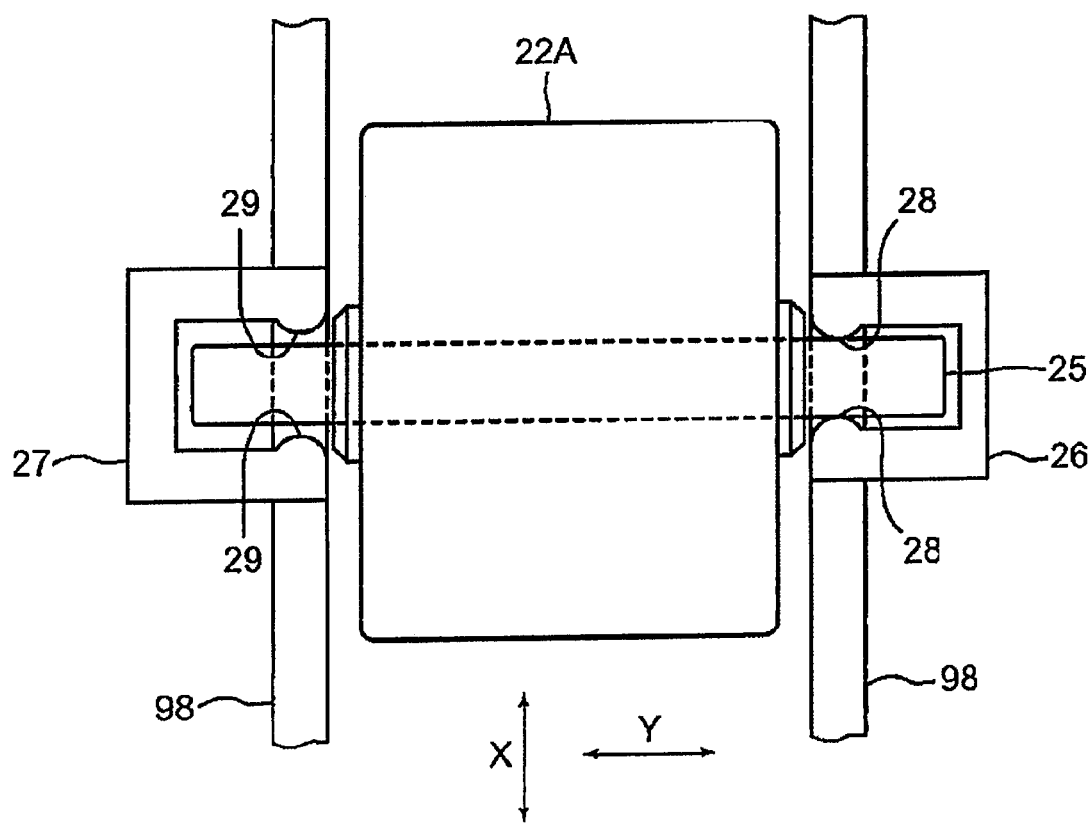
FIG. 5 is a schematic plan view showing a structure of a pad roller shown in FIG. 1 and its surrounding part.
Figure 6:
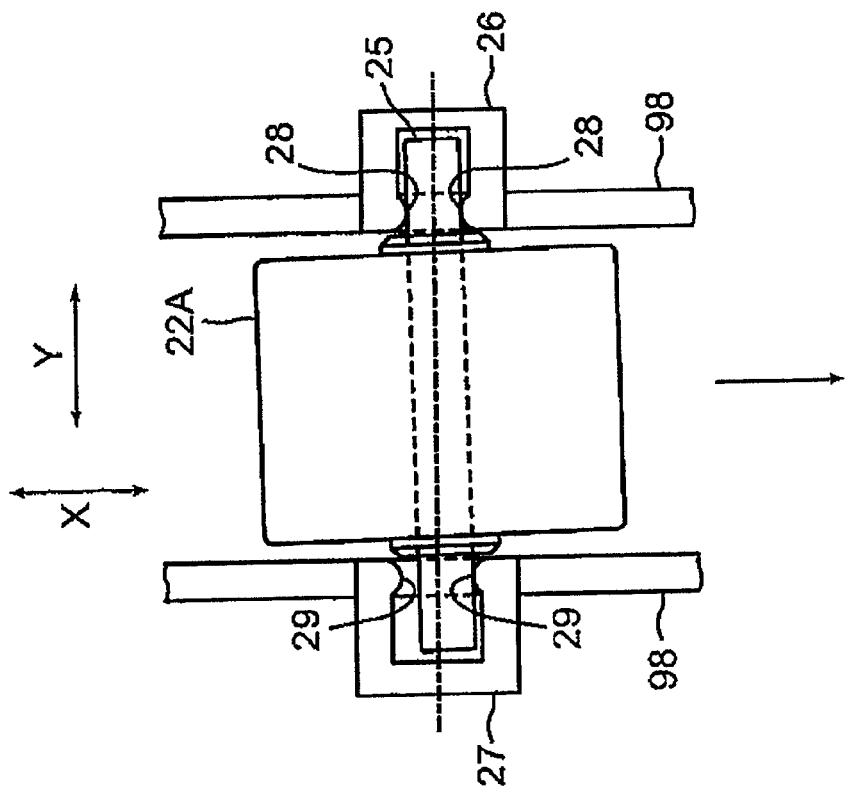
Figure 6:
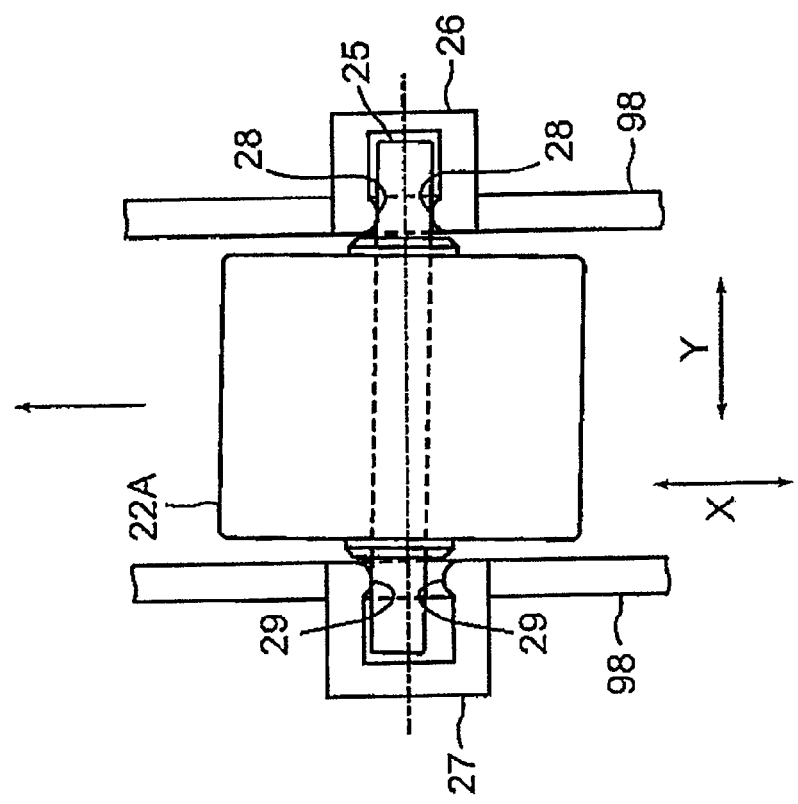

FIG. 5 is a schematic plan view showing a structure of the pad roller 22A shown in FIG. 1 and its surrounding part. Meanwhile, FIGS. 6A and 6B are drawings for explaining an action of the pad roller 22A shown in FIG. 5; wherein FIG. 6A and FIG. 6B show conditions where the medium 2 is transferred toward the backside and the front side, respectively.

The transfer means for transferring the medium 2 includes the transfer rollers 20 that are drive rollers to be rotated by means of a drive motor 120 (Refer to FIG. 2) as a drive source, and the pad rollers 22 that are driven rollers placed so as to face the transfer rollers 20. Operation of transferring the media 2 is carried out by a drive force of the transfer rollers 20, while the media 2 is sandwiched between the transfer rollers 20 and the pad rollers 22.

In the present embodiment, the four transfer rollers 20A to 20D and the pad rollers 22A to 22D are placed in the transfer path 10. Concretely to describe, the transfer rollers 20A to 20D and the pad rollers 22A to 22D are placed in this order from the front side toward the backside. Furthermore, between the transfer path 10 and the medium insertion section 3, a transfer roller 20E and a pad roller 22E are positioned, and meanwhile two transfer rollers 20F and 20G as well as pad rollers 22F and 22G are positioned in the evacuation path 52.

There are various applicable methods as a transmission means of a drive force of the drive motor 120 to the transfer rollers 20. For example, in the present embodiment, the drive force of the drive motor 120 is transmitted from a pulley 121 placed on a shaft of the drive motor 120 to pulleys 128 and 130 through a belt 129 in order to turn each of the transfer rollers 20C and 20D that is placed on the same shaft as each corresponding one of the pulleys 128 and 130, as shown in FIG. 1. Moreover, also for the other transfer rollers 20A and 20B; the drive force of the drive motor 120 is transmitted through a similar transmission means in order to turn the transfer rollers 20A and 20B.

Furthermore, also for the transfer roller 20E positioned between the transfer path 10 and the medium insertion section 3, as well as the transfer rollers 20F and 20G positioned in the evacuation path 52; the drive force of the drive motor 120 is transmitted through a similar transmission means in order to turn the transfer rollers 20E, 20F, and 20G. Incidentally, another drive motor beside the drive motor 120 may be prepared separately as a drive source for the transfer rollers 20F and 20G. In such a case, a drive force of the drive motor separately prepared is transmitted through, for example, pulleys 131, 132, and 133 as well as a belt 134 shown in FIG. 1.

Each of the pad rollers 22A to 22G is biased against each corresponding one of the transfer rollers 20A and 20G so that the pad rollers rotate while following the drive force of the transfer rollers 20. Although no specific limitation exists with regard to the biasing means, usually a spring, etc. is used for the purpose. In the present embodiment, the pad rollers 22A to 22D are opposing rollers that oppose to the transfer rollers 20A and 20D placed in the transfer path 10.

The pad roller 22A is coaxially fixed to a turning shaft 25, as shown in FIG. 5. One end (i.e., a first end) of the turning shaft 25 is so supported by a bearing unit 26 as to be rotatable. Meanwhile, the other end (i.e., a second end) of the turning shaft 25 is so supported by a bearing unit 27 as to be rotatable. The bearing unit 26 is located at a side of the datum surface for transfer motion 15 (at a backside in the drawing of FIG. 1), while the bearing unit 27 is located at an opposite side from the datum surface for transfer motion 15 (at a front side in the drawing of FIG. 1). Then, the bearing unit 26 and the bearing unit 27 are fixed to a bearing unit fixing part 98 formed in the guide 90.

As shown in FIG. 5, two shaft support parts 28 are so formed in the bearing unit 26 as to support the turning shaft 25 in the medium transfer direction "X". Meanwhile, two shaft support parts 29 are so formed in the bearing unit 27 as to support the turning shaft 25 in the medium transfer direction "X".

A space between the two shaft support parts 28 in the medium transfer direction "X" is almost the same as, or a litter larger than, a diameter of the turning shaft 25. In the meantime, a space between the two shaft support parts 29 in the medium transfer direction "X" is larger than the diameter of the turning shaft 25. Therefore, the turning shaft 25 can tilt by using the first end side as a fulcrum. In other words, the second end side of the turning shaft 25 is displace-able in the medium transfer direction "X" by using the first end side as a fulcrum. Thus, the pad roller 22A is supported through the turning shaft 25 by using the bearing units 26 and 27 in such a way that, in the pad roller 22A, the opposite side from the datum surface for transfer motion 15 is displace-able in the medium transfer direction "X".

In the present embodiment; under a condition in which an axis direction of the pad roller 22A (namely, an axis direction of the turning shaft 25) is almost in line with the medium-width-wise direction "Y", a space is made between one of the two shaft support parts 29 placed at the front side and the turning shaft 25, while another space is also made between the other of the two shaft support parts 29 placed at the backside and the turning shaft 25, as shown in FIG. 5. Therefore, the second end side of the turning shaft 25 (namely, a second end side of the of the pad roller 22A) is displace-able in both the back-and-forth directions of the medium transfer direction "X" from a condition where an axis direction of the pad roller 22A is almost in line with the medium-width-wise direction "Y".

Concretely to describe; in a condition shown in FIG. 5, the space between one of the two shaft support parts 29 placed at the front side and the turning shaft 25 is almost the same as the space between the other of the two shaft support parts 29 placed at the backside and the turning shaft 25. Then, the second end side of the turning shaft 25 is displace-able for almost the same distance in both the back-and-forth directions of the medium transfer direction "X" from a condition where the axis direction of the pad roller 22A is almost in line with the medium-width-wise direction "Y".

When the media 2 is transferred toward the backside while being sandwiched between the transfer roller 20A and the pad roller 22A, the second end side of the turning shaft 25 is displaced toward the backside by a frictional force generated between the media 2 and the pad roller 22A until the turning shaft 25 contacts one shaft support part 29 placed at the backside by using the first end side of the turning shaft 25 (a side of the datum surface for transfer motion 15) as a fulcrum, as FIG. 6A shows. In other words, the second end side of the pad roller 22A is displaced toward the backside, and the pad roller 22A is tilted in a direction for shifting the media 2, being transferred toward the backend, toward the first end side (the side of the datum surface for transfer motion 15).

When the media 2 is transferred toward the front side while being sandwiched between the transfer roller 20A and the pad roller 22A, the second end side of the turning shaft 25 is displaced toward the front side by a frictional force generated between the media 2 and the pad roller 22A until the turning shaft 25 contacts one shaft support part 29 placed at the front side by using the first end side of the turning shaft 25 (a side of the datum surface for transfer motion 15) as a fulcrum, as FIG. 6B shows. In other words, the second end side of the pad roller 22A is displaced toward the front side, and the pad roller 22A is tilted in a direction for shifting the media 2, being transferred toward the front end, toward the first end side (the side of the datum surface for transfer motion 15).

In the same way as the pad roller 22A, each of the pad rollers 22B to 22E is also coaxially fixed to the turning shaft 25 that is so supported by the bearing units 26 and 27 as to be rotatable. Therefore, in the same manner as the pad roller 22A, the pad rollers 22B to 22E are also tilted in accordance with a direction in which the media 2 is transferred.

In the present embodiment, the space between the two shaft support parts 29 is set in such a way that; the further the position of a pad roller is in the direction from the front side toward the backside, the less the tilt angle of the pad rollers 22A to 22E becomes. Namely, further the position of a pad roller is in the direction from the front side toward the backside, the narrower the space between the two shaft support parts 29 of the pad roller becomes. However, the space between the two shaft support parts 29 may also be set in such a way that the pad rollers 22A to 22E have the same tilt angle. Furthermore, the space between the two shaft support parts 29 may be set in such a way as well that a group of the pad rollers 22A, 22B, and 22E, or a group of the pad rollers 22A and 22E has a larger tilt angle, while a group of the pad rollers 22C and 22D, or a group of the pad rollers 22B to 22D has a smaller tilt angle.

On the other hand, each of the pad rollers 22F and 22G is coaxially fixed to the turning shaft 25 that is so supported at its both ends by the bearing units 26 and 27 as to be rotatable. Therefore, when the media 2 is transferred while being sandwiched between the transfer rollers 20F and 20G and the pad rollers 22F and 22G, the pad rollers 22F and 22G are not tilted. Incidentally, each of the pad rollers 22F and 22G may also be coaxially fixed to the turning shaft 25 that is so supported by the bearing units 26 and 27 as to be rotatable, in the same way as the pad roller 22A.

7. Structure of the Scanner

Figure 7:
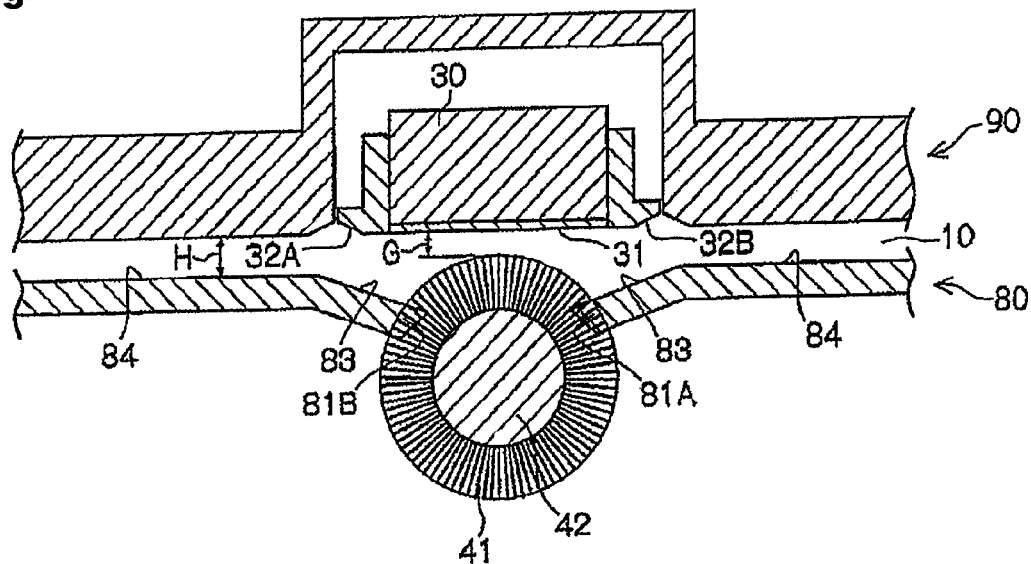
FIG. 7 is a cross-sectional schematic view showing a positional relationship between a scanner and a bristle brush roller shown in FIG. 2.

FIG. 7 is a cross-sectional schematic view showing a positional relationship between one of the scanners 30 and one of the bristle brush rollers 40 shown in FIG. 2.

In the example shown in FIG. 1 and FIG. 2, two scanners 30 in total are placed; with one placed at an upper side and the other at a lower side of the transfer path 10. However, only one of the two sides may have the scanner. The scanner 30 functions to read image data (character information and image information) printed on the medium 2 by scanning mainly in a medium-width-wise direction "Y", perpendicular to a medium transfer direction "X" in which the medium 2 is transferred, and by sub-scanning in the medium transfer direction "X". A surface of the scanner 30 (i.e., the surface being at a side of the transfer path 10) is a reading surface 31 (as FIG. 7 shows), and the surface is usually made of glass. Image data captured by the scanner 30 is sent to the higher-level host computer for controlling subsequent operations, etc. Incidentally, as shown in FIG. 7, the reading surface 31 of the scanner 30 should preferably be provided with tapered parts 32A and 32B before and after the reading surface 31 in the medium transfer direction "X" for not interfering with the medium 2 being transferred.

8. Structure of the Bristle Brush Roller

As shown in FIG. 2, FIG. 7, and others, the bristle brush roller 40 is so placed as to face the reading surface 31 of the scanner 30 described above. Though the bristle brush roller 40 can be illustrated by an example in a popular form that bristles 41 are implanted in a bristle implantation base 42 around a shaft 43 (Refer to FIG. 4), it is not limited to the form. For example; in a different form that can be named, another bristle implantation base 42 of a bristle-implanted sheet is wrapped onto the shaft 43 in a spiral manner, and then it is glued by using adhesive or equivalent.

As a material for "bristles" for making up the bristle brush roller 40; a resin fiber of polyester (e.g., polyethylene terephthalate), acrylic, nylon, and the like, for example, can be used. Preferably, the bristle brush roller 40 should be electrically-conductive, and therefore a material for the brush may be a hybrid one, for example, including the resin fiber described above and an electrically-conductive fiber (e.g., a carbon fiber); or the brush may also be made of a resin fiber containing an electrically-conductive material (such as carbon particles, and conductive metal particles). The bristle brush roller 40 with electrical-conductivity enables removal of static electricity that the medium 2 may have. Preferably, electrical resistance of the bristles 41 of the bristle brush should be within a range of 1 to $1 \times 10^8$ Ω-cm or less.

More concretely to describe, it is preferable to use the bristles having specifications with; a single fiber fineness of 200 to 400 dtex (where, 1 dtex (degi-tex) corresponds to 1 g with $1.0 \times 10^4$ m in length), a density of 50 to 100 single fibers/mm$^2$, and [fiber fineness]×[density] within a range of $1.0 \times 10^4$ to $4.0 \times 10^4$. Using the bristles having specifications within these ranges can achieve an effect of guiding the medium 2 to the reading surface 31 safely while curbing a jam of the medium 2, being less elastic. Preferably named as an example are the bristles with a fiber fineness of 260 dtex, and a density of 80 single fibers/mm$^2$ (fiber fineness×density=$2.1 \times 10^4$).

As shown in FIG. 7, between the bristle brush roller 40 and the reading surface 31 (glass surface) of the scanner 30, there is a gap "G" that allows the medium 2 to pass through. The gap "G" is so set as to be narrower than the thickness of medium 2 that the image reader 1 handles. As the gap "G" is so set as described above, the bristle brush roller 40 regulates a surface 2B (or 2A) opposite to a to-be-read surface 2A (2B) of the medium 2 in order to guide the medium 2 being transferred by the transfer rollers 20.

It is preferable to adjust the gap "G" according to the type of medium 2 to be handled. For example, it is preferable that the gap "G" is adjusted for two cases separately (i.e., one case for the image reader 1 for handling exclusively less-elastic paper media such as a check, and the like; and the other for the image reader 1 for handling exclusively paper media that are thicker and more elastic than a check, and the like).

A bristle brush roller 40B assembled in the upper transfer block 9 rotates by using a drive force of the drive motor 120. As shown in FIG. 1, the drive force of the drive motor 120 is transmitted from pulley 121 to the pulley 122 through a belt 123, then further transmitted from a pulley 124 placed on the same shaft as the pulley 122 to another pulley (placed on the same shaft as a gear 126, but not shown in the drawing) through a belt 125, and still further transmitted to a gear 127 gearing with the gear 126 placed on the same shaft as the pulley. The bristle brush roller 40B is placed onto the same shaft as the gear 127, and thus it rotates by using the drive force of the drive motor 120 transmitted to the gear 127. Moreover, the drive force of the drive motor 120 is also transmitted to a bristle brush roller 40A assembled in the lower transfer stage 8 in a similar manner so that the bristle brush roller 40A is also turned by the drive force of the drive motor 120.

9. Structure of the Guide

Figure 8:
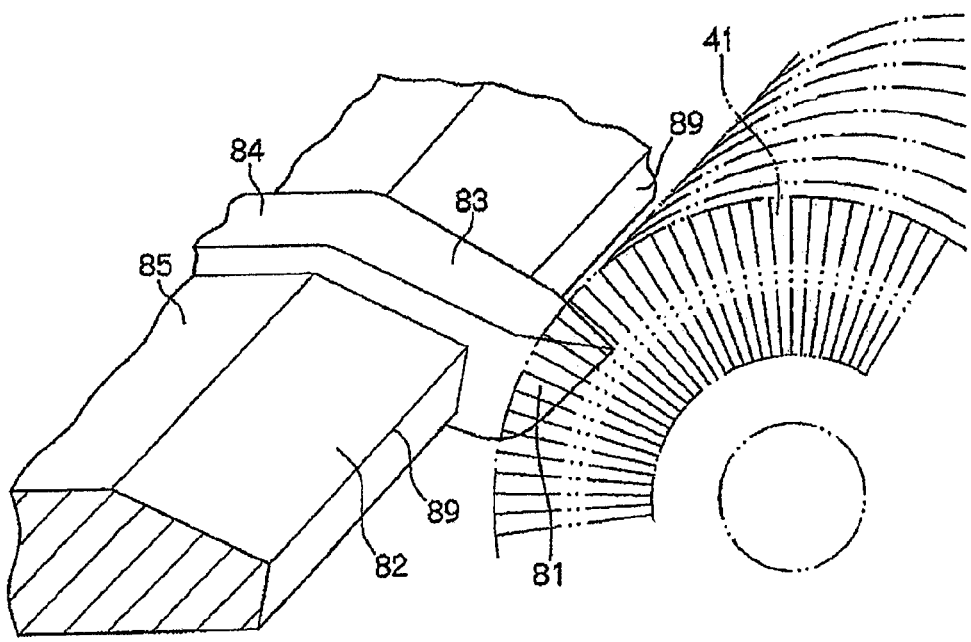
FIG. 8 is a schematic view showing a protrusion that pushes through bristles of the bristle brush roller shown in FIG. 1.

FIG. 8 is a schematic view showing a protrusion 81 that pushes through bristles 41 of the bristle brush roller 40 shown in FIG. 1.

As shown in FIG. 4, FIG. 7, and FIG. 8; constituting one of characteristic structures of the present embodiment, the guides 80 and 90 operate in cooperation with the bristle brush rollers 40 described above. Concretely to describe, the guide 80 is assembled in the lower transfer stage 8 in which the bristle brush roller 40A is placed. The guide 80 includes: the flat surface 85 that regulates the transfer path 10 at a side of the bristle brush roller 40, and the plurality of slit guides 84 extending along the medium transfer direction "X" on the flat surface 85 at a side of the transfer path 10. The slit guides 84 work for helping the medium 2 to move along the medium transfer direction "X", being formed at arbitrary intervals on the flat surface 85 so as to be protrusions with prescribed height.

The guide 80 includes: an aperture 88, at which the bristle brush roller 40 is assembled so as to face the transfer path 10 through the aperture; and a plurality of protrusions 81A and 81B that protrude out of an edge 89 of the aperture 88 toward the bristle brush roller 40 in a direction parallel with the medium transfer direction "X" so as to push through bristles 41 of the bristle brush roller 40. As shown in FIG. 8, each of the protrusions 81A and 81B is shaped so as to have a triangle ship-prow form that gradually becomes thinner in section toward the bristle brush roller 40. Incidentally, the length of a part of each of the protrusions 81A and 81B entering into the bristle brush roller 40 should preferably be, for example, about 1 to 2 mm.

A neighboring part of the guide 80 adjacent to the aperture 88 (which is namely a part between the edge 89 of the aperture 88 and the flat surface 85 in the medium transfer direction "X") is formed with a slope 82 that becomes gradually distant from the transfer path 10 toward the bristle brush roller 40 in the medium transfer direction "X", as shown in FIG. 7 and FIG. 8. On the slope 82, slit guides 83 are formed.

As shown in FIG. 4, formed in the guide 80 are a scanner mounting part 86 as well as roller installation parts 87 (87A to 87C).

The guide 90 is assembled in the upper transfer block 9 in which the bristle brush roller 40B is placed. The guide 90 is structured in a similar manner as the guide 80, and therefore explanation on the guide 90 is omitted.

10. Operation of Taking in the Medium

Figure 9:
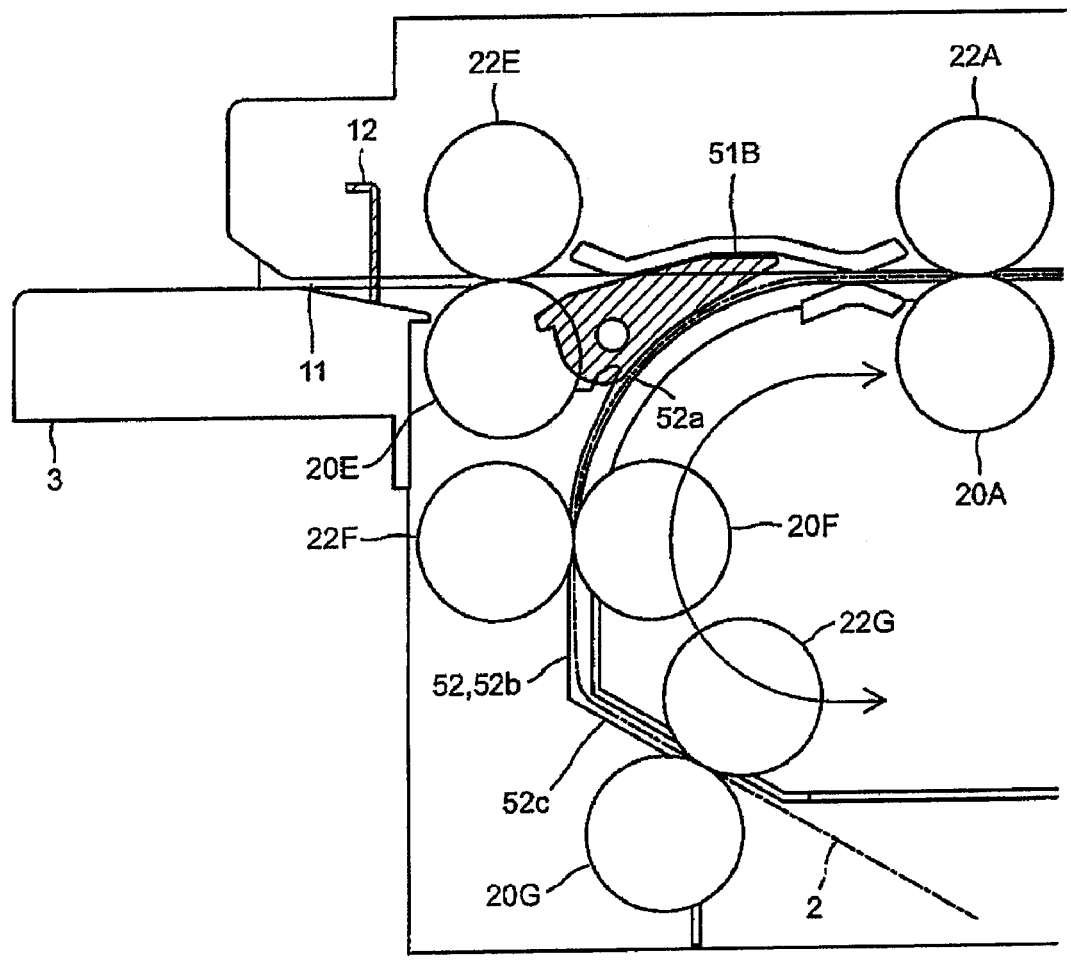
FIG. 9 is a drawing that explains a shifting operation of the medium in a width-wise direction in the image reader shown in FIG. 1.
Figure 10:
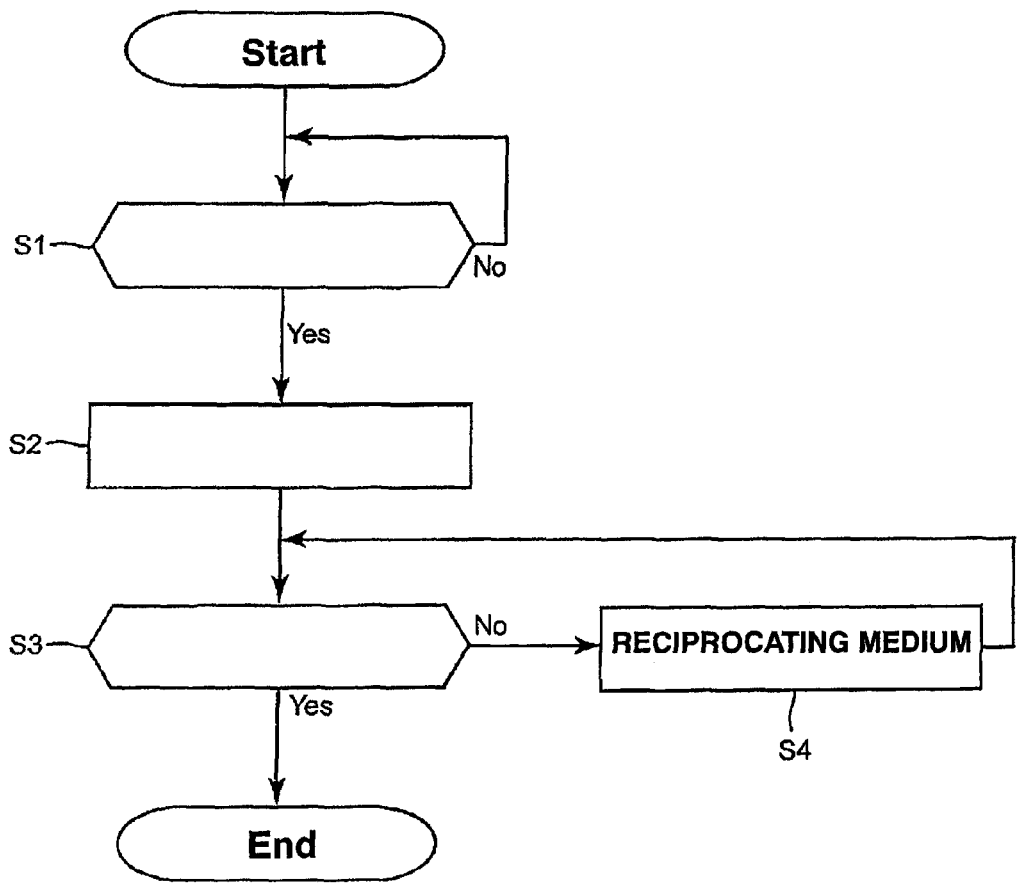
FIG. 10 is a flowchart showing a flow of control operation at the time when the medium is taken into the image reader shown in FIG. 1.

FIG. 9 is a drawing that explains a shifting operation of the medium 2 in a width-wise direction in the image reader 1 shown in FIG. 1. FIG. 10 is a flowchart showing a flow of control operation at the time when the medium 2 is taken into the image reader 1 shown in FIG. 1.

In the image reader 1 structured as described above, the medium 2 is taken into the apparatus in such a manner as explained below.

At first, when being in standby condition waiting for insertion of the medium 2 according to a control command from the higher-level host computer, a control unit of the image reader 1 (hereinafter, called the control unit) judges whether or not both the insertion detection sensors 13A and 13B have detected the medium 2 (Step S1).

If the insertion detection sensor 13B detects the medium 2, the control unit moves the shutter 12 to open the medium passage 11. On the other hand, if the insertion detection sensor 13A detects the medium 2, the control unit operates the transfer means, such as the transfer rollers 20, in order to transfer the medium 2 toward the backside up to a prescribed position in the image reader 1 (Step S2). Also, in Step S2, the scanner 30 reads the character information and the like of the medium 2. Furthermore, in Step S2, the magnetizing head 71 magnetizes MICR data to be described on a surface of the medium 2, and then the magnetic head 70 reproduces the magnetized MICR data. Incidentally, when the medium 2 has been transferred up to the prescribed position in the image reader 1, the shutter 12 closes the medium passage 11 and the change lever 51 operates to have its closed position 51B.

Subsequently, the control unit or the host computer judges (Step S3) whether or not the scanner 30 has appropriately read the character information and the like in Step S2. If a tilt of the medium 2, transferred up to the prescribed position, in the medium transfer direction "X" is small at this time, a tilt of the character information and the like read by the scanner 30 is also small so that the scanner 30 can appropriately read the character information and the like. Therefore, when the tilt of the medium 2, transferred up to the prescribed position, in the medium transfer direction "X" was small and the scanner 30 could appropriately read the character information and the like (Step S3:Yes), the image reader 1 completes operation of taking in the medium 2.

On the other hand, if the tilt of the medium 2, transferred up to the prescribed position, in the medium transfer direction "X" is large, the tilt of the character information and the like read by the scanner 30 is also large so that the scanner 30 cannot appropriately read the character information and the like. Therefore, when the tilt of the medium 2, transferred up to the prescribed position, in the medium transfer direction "X" is large and the scanner 30 cannot appropriately read the character information and the like (Step S3: No), the medium 2 is reciprocated for correcting its tilt by shifting the medium 2 toward the datum surface for transfer motion 15 (Step S4).

Concretely to describe, the medium 2 is once reciprocated inside the image reader 1 by using the evacuation path 52, as shown in FIG. 9. Namely, the medium 2 is once reciprocated in a direction of arrows shown in FIG. 9. At this time, the change lever 51 has its closed position 51B. The medium 2 reciprocated in Step S4 is shifted toward the datum surface for transfer motion 15 by the action of the pad rollers 22A and 22D to contact the datum surface for transfer motion 15. When the medium 2 contacts the datum surface for transfer motion 15, the tilt of the medium 2 is corrected by the datum surface for transfer motion 15. Then, in Step S4, the scanner 30 reads the character information and the like of the medium 2. Moreover, in Step S4, the magnetizing head 71 magnetizes MICR data to be described on a surface of the medium 2, and then the magnetic head 70 reproduces the magnetized MICR data.

After the reciprocating motion in Step S4, operation returns to Step S3 to judge whether or not the scanner 30 has appropriately read the character information and the like. As a result, if the scanner 30 has appropriately read the character information and the like, operation of taking in the medium 2 completes. If the scanner 30 has not appropriately read the character information and the like, operation returns to Step S4 again to reciprocate the medium 2 furthermore for correcting the tilt of the medium 2.

In the present embodiment, the tilt of the medium 2 in the medium transfer direction "X" is detected through reading the character information and the like by using the scanner 30 as the tilt detection means. Furthermore, also at the time when the medium 2 is transferred in Step S2, the medium 2 is shifted toward the datum surface for transfer motion 15 by the action of the pad rollers 22A and 22E for correcting the tilt of the medium 2.

11. Primary Advantageous Effect of the Present Embodiment

As described above, in the present embodiment, between the bristle brush roller 40 and the reading surface 31 of the scanner 30 there exists the gap "G" that allows the medium 2 to pass through. Furthermore, when the transfer rollers 20 transfers the medium 2 in the medium transfer direction "X", the bristle brush roller 40 regulates the surface 2B (or 2A) opposite to the to-be-read surface 2A (2B) of the medium 2 in order to guide the medium 2. Therefore, the character information and the like of the medium 2 can be held within a depth of field of the scanner 30 without bruising the reading surface 31 of the scanner 30 by the bristles 41. Furthermore, even if the medium 2 is less elastic, the medium 2 can be transferred without causing a jam.

Not found in any conventional art are the structure of having the gap "G" between the bristle brush roller 40 and the reading surface 31 of the scanner 30 as well as the effect according to the structure as described above. Furthermore, since the bristles 41 and the reading surface 31 (glass surface) do not contact each other, it is possible to achieve a new effect, not have been observed conventionally, that a turning load caused by the bristle brush roller 40 due to contacting the reading surface 31 can be reduced, and a transferring load caused by the bristles 41 at the time of transferring the medium 2 being less elastic can be reduced.

When the medium 2 has any solid foreign material attached to it, such as a clip, a staple, etc., the bristle brush roller 40 can catch those solid foreign materials by using the bristles 41 made of flexible material. In other words, since the bristle brush roller 40 is used in the present embodiment, the bristle brush roller 40 can hold any solid foreign material, such as a clip, a staple, etc., attached to the medium 2 within the bristle brush roller 40. Therefore, the reading surface 31 of the scanner 30 can be protected from having damage due to any solid foreign material. Furthermore, since there exists the gap "G" between the bristle brush roller 40 and the reading surface 31 of the scanner 30, the reading surface 31 of the scanner 30 can be protected from having any damage even when the bristle brush roller 40 holds the solid foreign material.

Preferably, the bristle brush roller 40 to be used should be provided with the bristles 41 colored in black, or the bristle brush roller 40 including much black fiber should be used. Then, if the bristle brush roller 40 has any solid foreign material attached to it, such as paper, a clip, a staple, etc., colored in white or silver, the material can be recognized easily as a foreign material.

Furthermore, each of the lower transfer stage 8 and the upper transfer block 9 is equipped with the bristle brush roller 40 as shown in FIG. 1 and FIG. 2, and therefore the to-be-read surfaces 2A and 2B of the medium 2 can also be cleaned by the bristle brush roller 40.

In the present embodiment, each of the guides 80 and 90 includes the plurality of protrusions 81A and 81B that protrude out of the edge 89 of the aperture 88 toward the bristle brush roller 40 in a direction parallel with the medium transfer direction "X" so as to push through bristles 41 of the bristle brush roller 40. Accordingly, there exists no gap between the guide 80/90 and the bristle brush roller 40 into which the medium 2 being transferred can enter, so that it is possible to prevent the medium 2 from entering the gap to cause a jam. In particular, according to the structure described above, an effect of reducing a chance of jamming can be achieved even when the medium 2 is thin and sheet-like, such as a once-folded less-elastic check or bill.

In the present embodiment, each of the protrusions 81A and 81B is shaped so as to have a triangle ship-prow form that gradually becomes thinner in section toward the bristle brush roller 40. Therefore, the bristle brush roller 40 is not likely to have a trail (trace mark) of the protrusions 81, and the whole surface of the medium 2 can have a brushing effect by the bristles 41. Furthermore, such a triangle ship-prow form makes it easy to push through bristles 41, and accordingly an effect of raking out foreign materials collected in the bristles 41 can also be achieved.

In the present embodiment, the neighboring part of each of the guides 80 and 90 adjacent to the aperture 88 is formed with the slope 82 that becomes gradually distant from the transfer path 10 toward the bristle brush roller 40 in the medium transfer direction "X". As a result, a point of the neighboring part at the edge 89 of the aperture 88 is most distant from the transfer path 10. Therefore, the medium 2 does not get hooked at the slope 82 or the edge 89 so as to enable reducing a chance of jamming.

In the present embodiment, each of the pad rollers 22A to 22D is supported by using the bearing units 26 and 27 in such a way that the second end side of the pad roller (the opposite side from the datum surface for transfer motion 15) is displace-able in the medium transfer direction "X". Therefore, when the medium 2 being transferred comes in contact with the corresponding one(s) of the pad rollers 22A to 22D, those of the pad rollers 22A to 22D are tilted by a friction force generated between the medium 2 and those of the pad rollers 22A to 22D in such a direction to shift the medium 2 toward the datum surface for transfer motion 15 while using the side of the datum surface for transfer motion 15 as a fulcrum. Accordingly, by the action of the pad rollers 22A to 22D, the medium 2 being transferred can smoothly be shifted toward the datum surface for transfer motion 15. Then, if the medium 2 is tilted in the medium transfer direction "X", the tilt can be corrected by making the medium 2 contact with the datum surface for transfer motion 15.

Furthermore, by setting the displacement amount of the pad rollers 22A to 22D appropriately (concretely to describe, by setting the space between the two shaft support parts 29 appropriately), it is possible to avoid an excessive load on the medium 2 moving toward the datum surface for transfer motion 15. Therefore, it becomes possible to protect the medium 2, even if being with less strength, from damage during transfer operation.

In the present embodiment, when being shifted toward the datum surface for transfer motion 15, the medium 2 is reciprocated inside the image reader 1 by using the evacuation path 52. Namely, in the present embodiment, for correcting the tilt of the medium 2 in the medium transfer direction "X" by shifting the medium 2 toward the datum surface for transfer motion 15, the evacuation path 52 is prepared in order to reciprocate the medium 2. Therefore, in comparison with a structure of a conventional art in which a transfer path is so formed as to circulate the medium 2, an installation space for the transfer path 10 and the evacuation path 52 in the present embodiment can be reduced. As a result, the image reader 1 of the present embodiment can be downsized.

Furthermore, even though the image reader 1 is compact, none of the medium 2 is exposed from the medium insertion section 3 so that erroneous operation by user can be avoided.

Moreover, in the present embodiment, when being shifted toward the datum surface for transfer motion 15, the medium 2 is reciprocated by using the evacuation path 52. Therefore, in comparison with a case where the medium 2 is circulated, a transfer distance of the medium 2 for shifting it toward the datum surface for transfer motion 15 can be shortened. Accordingly, handling time for the medium 2 can be shortened. Moreover, in the present embodiment, the 4 transfer rollers 20A to 20D as well as the pad rollers 22A to 22D are placed in the transfer path 10; and therefore, in comparison with a structure of a conventional art in which transfer rollers are placed in proximity to a border between a flat surface part and a curved surface part, the medium 2 can be shifted toward the datum surface for transfer motion 15 in a short time in the present embodiment.

In the present embodiment, the transfer path 10 is so formed as to be almost linear in order to allow the medium 2 being transferred to move linearly, and meanwhile the evacuation path 52 is so formed as to curve downward from the transfer path 10. Therefore, the image reader 1 can be downsized in the medium transfer direction "X"; and furthermore, since the transfer path 10 is formed to be almost linear, the medium 2 to be transferred through the transfer path 10 can easily be protected from damage.

In the present embodiment, the change lever 51 is positioned at the border between the transfer path 10 and the evacuation path 52. Therefore, the medium 2 to be reciprocated by the transfer means can be guided into the evacuation path 52 for sure.

In the present embodiment, the second end side of each of the pad rollers 22A to 22D is displace-able in both the back-and-forth directions of the medium transfer direction "X" from a condition where the axis direction of the corresponding one of the pad roller 22A to 22D is almost in line with the medium-width-wise direction "Y". Therefore, in both cases where the medium 2 is transferred toward the backside and also toward the front side, the medium 2 can be shifted toward the datum surface for transfer motion 15 by the action of the pad roller 22A to 22D. Accordingly, the medium 2 can be shifted to the datum surface for transfer motion 15 in a short time for correcting the tilt of the medium 2.

In the present embodiment, when both the insertion detection sensors 13A and 13B detect the medium 2, the shutter 12 opens the medium passage 11 and the transfer means starts operation. In other words, when both the insertion detection sensors 13A and 13B detect the medium 2, the image reader 1 becomes prepared to take in the medium 2. Thus, the image reader 1 takes in the medium 2 under condition where an edge of the medium 2 is positioned in proximity to the datum surface for transfer motion 15 in the medium-width-wise direction "Y". Therefore, according to the present embodiment, the medium 2 taken in can be shifted to the datum surface for transfer motion 15 in a short time.

12. Other Embodiments

Described above is an example of a preferred embodiment according to the present invention. However, the present invention is not limited to the above embodiment and various variations and modifications may be made without changing the concept of the present invention.

In the embodiment described above, the second end side of the turning shaft 25 is displace-able for almost the same distance in both the back-and-forth directions of the medium transfer direction "X" from a condition where the axis direction of the corresponding one of the pad rollers 22A to 22E is almost in line with the medium-width-wise direction "Y". However, otherwise for example, the second end side of the turning shaft 25 may be displace-able for inequable distances in directions toward the front side and the backside from a condition where the axis direction of the corresponding one of the pad rollers 22A to 22E is almost in line with the medium-width-wise direction "Y".

Moreover, in the embodiment described above, the second end side of the turning shaft 25 is displace-able in both the back-and-forth directions of the medium transfer direction "X" from a condition where the axis direction of the corresponding one of the pad rollers 22A to 22E is almost in line with the medium-width-wise direction "Y". However, the second end side of the turning shaft 25 may be displace-able only in one direction of the medium transfer direction "X" (toward either the front side or the backside) from a condition where the axis direction of the corresponding one of the pad rollers 22A to 22E is almost in line with the medium-width-wise direction "Y".

In the embodiment described above, a space between the two shaft support parts 29 formed in the bearing unit 27 is constant and unchangeable. However, otherwise for example, the image reader 1 may include a displacement amount adjusting means for each of the pad rollers 22A to 22E, wherein the displacement amount adjusting means adjust the space between the two shaft support parts 29 of the pad roller in order to adjust the displacement amount of the pad roller at its side opposite from the datum surface for transfer motion 15. In this case, the displacement amount of the pad rollers 22A to 22E can be set according to the strength of the medium 2. In other words, the tilt of the pad rollers 22A to 22E can be set in accordance with the strength of the medium 2. Accordingly, it is possible to avoid an excessive load on the medium 2 moving toward the datum surface for transfer motion 15. Therefore, it becomes possible to protect the medium 2 with less strength from damage during transfer operation for sure. Furthermore, the medium 2 having a fairly high strength can be shifted to the datum surface for transfer motion 15 in a short time.

In the embodiment described above, the evacuation path 52 is so formed as to be branched from the front side of the transfer path 10. However, otherwise for example, the evacuation path 52 may be as well so formed as to be branched from the backside of the transfer path 10. Furthermore, the evacuation path 52 in the embodiment described above is so formed as to curve downward from the transfer path 10, it may be as well be so formed as to curve upward from the transfer path 10.

In the descriptions above, the embodiment according to the present invention is explained by an example of the image reader 1. However, configuration of the invention with respect to claims 7 to 14 can be applied to various medium processors besides the image reader 1. For example, the configuration of the invention with respect to claims 7 to 14 can be used in a medium processor as well that includes the magnetizing head 71 and the magnetic head 70 but does not include the scanner 30.

Incidentally, a printing unit (a printer), a stamping unit, and the like may be installed at a backside of the image reader 1. Such a printing unit and the like can be connected by using fastening members such as a connection flange, bolts, nuts, etc. that the image reader 1 has.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1 Image reader (Medium processor)
2 Medium
3 Medium insertion section
10 Transfer path
11 Medium passage
12 Shutter
13A Insertion detection sensor (Insertion detection means)
15 Datum surface for transfer motion
20 (20A to 20D) Transfer roller
22A to 22D Pad roller (Opposing roller)
30 Scanner (Tilt detection means)
31 Reading surface
40 Bristle brush roller
41 Bristle
51 Change lever (Transfer direction changing means)
52 Evacuation path
80 and 90 Guide
81 (81A and 81B) Protrusion
82 Slope
88 Aperture
89 Aperture rim
G Gap
X Medium transfer direction
Y Medium-width-wise direction

What is claimed is:

1. An image reader comprising:
   a transfer path through which a sheet medium is transferred;
   a transfer means for transferring the medium through the transfer path;
   a scanner for reading image data printed on the medium by scanning mainly in a medium-width-wise direction, perpendicular to a medium transfer direction in which the medium is transferred, and by sub-scanning in the medium transfer direction; and
   a bristle brush roller facing the scanner across the transfer path and having bristles implanted on a surface of the roller;
   wherein a gap exists between the bristle brush roller and a reading surface of the scanner for allowing the medium to pass through;
   wherein, when the transfer means transfers the medium in the medium transfer direction, the bristle brush roller regulates a surface opposite to a to-be-read surface of the medium in order to guide the medium; and
   wherein the gap is sized such that, when the medium is transferred between the bristle brush roller and the reading surface of the scanner, the image data of the medium is held within a depth of filed of the scanner without bruising the reading surface of the scanner.

2. The image reader according to claim 1;
   wherein the transfer path includes a flat guide for regulating the transfer path at a side of the bristle brush roller; and
   wherein the guide further includes an aperture through which the bristle brush roller faces the transfer path, and a plurality of protrusions protruding out of an edge of the aperture toward the bristle brush roller in a direction parallel with the medium transfer direction so as to push through bristles of the bristle brush roller.

3. The image reader according to claim 1;
wherein each of the protrusions is shaped so as to have a triangle ship-prow form that gradually becomes thinner in section toward the bristle brush roller.

4. The image reader according to claim 2;
wherein a neighboring part of the guide adjacent to the aperture is formed with a slope that becomes gradually distant from the transfer path toward the bristle brush roller in the medium transfer direction.

5. The image reader according to claim 1;
wherein bristles of the bristle brush roller are made of an electrically-conductive material.

6. The image reader according to claim 1;
wherein the image reader is used for handling a thin sheet medium such as a check.

7. A medium processor comprising:
a transfer path through which a sheet medium is transferred;
a transfer means for transferring the medium; and
an evacuation path, connected to the transfer path, for evacuating the medium out of the transfer path, at least in a certain case;
wherein a datum surface for transfer motion, providing a datum position in a medium-width-wise direction for the medium during its transfer motion, is formed at an end in the medium-width-wise direction of the transfer path, perpendicular to a transfer direction of the medium;
wherein the transfer means includes a transfer roller positioned in the transfer path for transferring the medium, and an opposing roller placed so as to oppose to the transfer roller and biased against the transfer roller;
wherein the opposing roller is supported in such a way that, in the opposing roller, the opposite side from the datum surface for transfer motion is displace-able in the medium transfer direction; and
wherein the transfer means reciprocates the medium internally by using the evacuation path for shifting the medium, in a direction intersecting with the transfer direction of the medium, toward the datum surface for transfer motion.

8. The medium processor according to claim 7;
wherein the medium processor includes a tilt detection means for detecting a tilt of the medium in the medium transfer direction; and
wherein the transfer means reciprocates the medium internally by using the evacuation path if the tilt detection means detects a tilt of the medium.

9. The medium processor according to claim 7;
wherein the transfer path is so formed almost on the straight as to allow the medium being transferred to move straight; and
wherein the evacuation path is so formed as to be branched from the transfer path and to curve toward one of upward and downward directions from the transfer path.

10. The medium processor according to claim 9;
wherein the medium processor includes a medium insertion section for inserting the medium; and
wherein the evacuation path is so formed as to be branched from a side of the medium insertion section in the transfer path.

11. The medium processor according to claim 10;
wherein the medium processor includes a transfer direction changing means at a border between the transfer path and the evacuation path for enabling transfer operation of the medium from the transfer path to one of the medium insertion section and the evacuation path.

12. The medium processor according to claim 7;
wherein the opposing roller is supported in such a way that, in the opposing roller, the opposite side from the datum surface for transfer motion is displace-able in both the back-and-forth directions of the medium transfer direction from a condition where the medium-width-wise direction is almost in line with an axis direction of the opposing roller.

13. The medium processor according to claim 7;
wherein the medium processor includes the medium insertion section for inserting the medium;
wherein the medium insertion section further includes a medium passage through which the medium passes, a shutter for opening and blocking the medium passage, and an insertion detection means placed at a side of the datum surface for transfer motion for detecting the medium being inserted; and
wherein, when the insertion detection means detects the medium, the shutter opens the medium insertion section and/or the transfer means starts operation for taking in the medium into the medium processor.

14. The medium processor according to claim 7;
wherein the medium processor includes a displacement amount adjusting means for adjusting the displacement amount of the opposing roller at its side opposite from the datum surface for transfer motion.

* * * * *